United States Patent
Hojo et al.

(10) Patent No.: US 9,556,813 B2
(45) Date of Patent: Jan. 31, 2017

(54) INTERNAL COMBUSTION ENGINE CONTROL DEVICE

(71) Applicant: TOYOTA JIDOSHA KABUSHIKI KAISHA, Toyota-shi, Aichi-ken (JP)

(72) Inventors: Akira Hojo, Susono (JP); Shingo Korenaga, Shizuoka (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/693,028

(22) Filed: Apr. 22, 2015

(65) Prior Publication Data

US 2015/0308364 A1   Oct. 29, 2015

(30) Foreign Application Priority Data

Apr. 25, 2014 (JP) ................................. 2014-091300
Feb. 16, 2015 (JP) ................................. 2015-027705

(51) Int. Cl.
| | | |
|---|---|---|
| F02D 41/00 | (2006.01) | |
| F02D 41/14 | (2006.01) | |
| F01N 3/22 | (2006.01) | |
| F01N 9/00 | (2006.01) | |
| F02D 41/02 | (2006.01) | |
| F02D 35/02 | (2006.01) | |

(52) U.S. Cl.
CPC ............ *F02D 41/1439* (2013.01); *F01N 3/22* (2013.01); *F01N 9/00* (2013.01); *F02D 41/008* (2013.01); *F02D 41/0255* (2013.01); *F02D 41/1446* (2013.01); *F01N 2430/06* (2013.01); *F01N 2900/1404* (2013.01); *F02D 35/023* (2013.01); *F02D 41/1447* (2013.01); *F02D 41/1448* (2013.01); *F02D 2200/021* (2013.01); *F02D 2200/0414* (2013.01); *Y02T 10/26* (2013.01); *Y02T 10/47* (2013.01)

(58) Field of Classification Search
CPC    F01N 3/22; F01N 2430/06; F01N 2900/1404; F02D 41/0255; F02D 41/1439; F02D 41/1446; F02D 41/1454
See application file for complete search history.

(56) References Cited

U.S. PATENT DOCUMENTS

| | | | | |
|---|---|---|---|---|
| 2009/0031706 A1* | 2/2009 | Miyashita | ............. | F01N 3/0871 60/285 |
| 2011/0265762 A1* | 11/2011 | Lorenz | ................. | F02D 35/027 123/406.45 |

FOREIGN PATENT DOCUMENTS

| | | | | |
|---|---|---|---|---|
| EP | 1600619 A2 * | 11/2005 | ......... | F02D 41/1441 |
| JP | H08-158858 A | 6/1996 | | |
| JP | 2004-270584 A | 9/2004 | | |

\* cited by examiner

*Primary Examiner* — Audrey K Bradley
(74) *Attorney, Agent, or Firm* — Andrews Kurth Kenyon LLP

(57) ABSTRACT

An internal combustion engine control device is provided. An engine executes A/F oscillation that alternates between lean combustion and rich combustion every cylinder. If a reaction state between rich gas and lean gas inside an exhaust passage on the upstream side of a catalyst is judged to be low, the assignment of cylinders conducting lean combustion and cylinders conducting rich combustion is swapped, so that rich combustion is conducted by a #1 cylinder farthest away from the catalyst in terms of the length of the exhaust passage, and also so that lean combustion is conducted by a #2 cylinder closer to the catalyst than the cylinder that is farthest away.

9 Claims, 12 Drawing Sheets

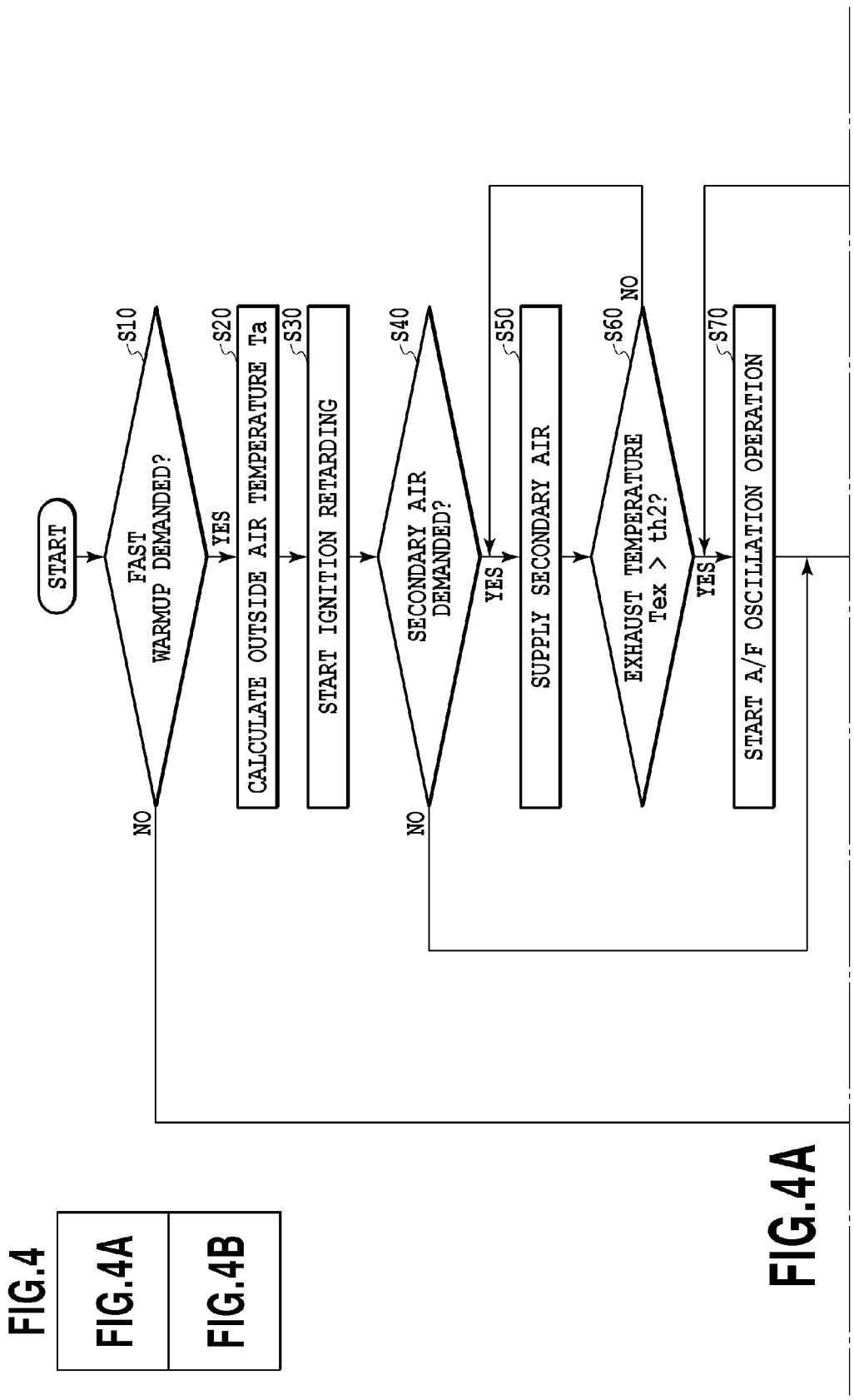

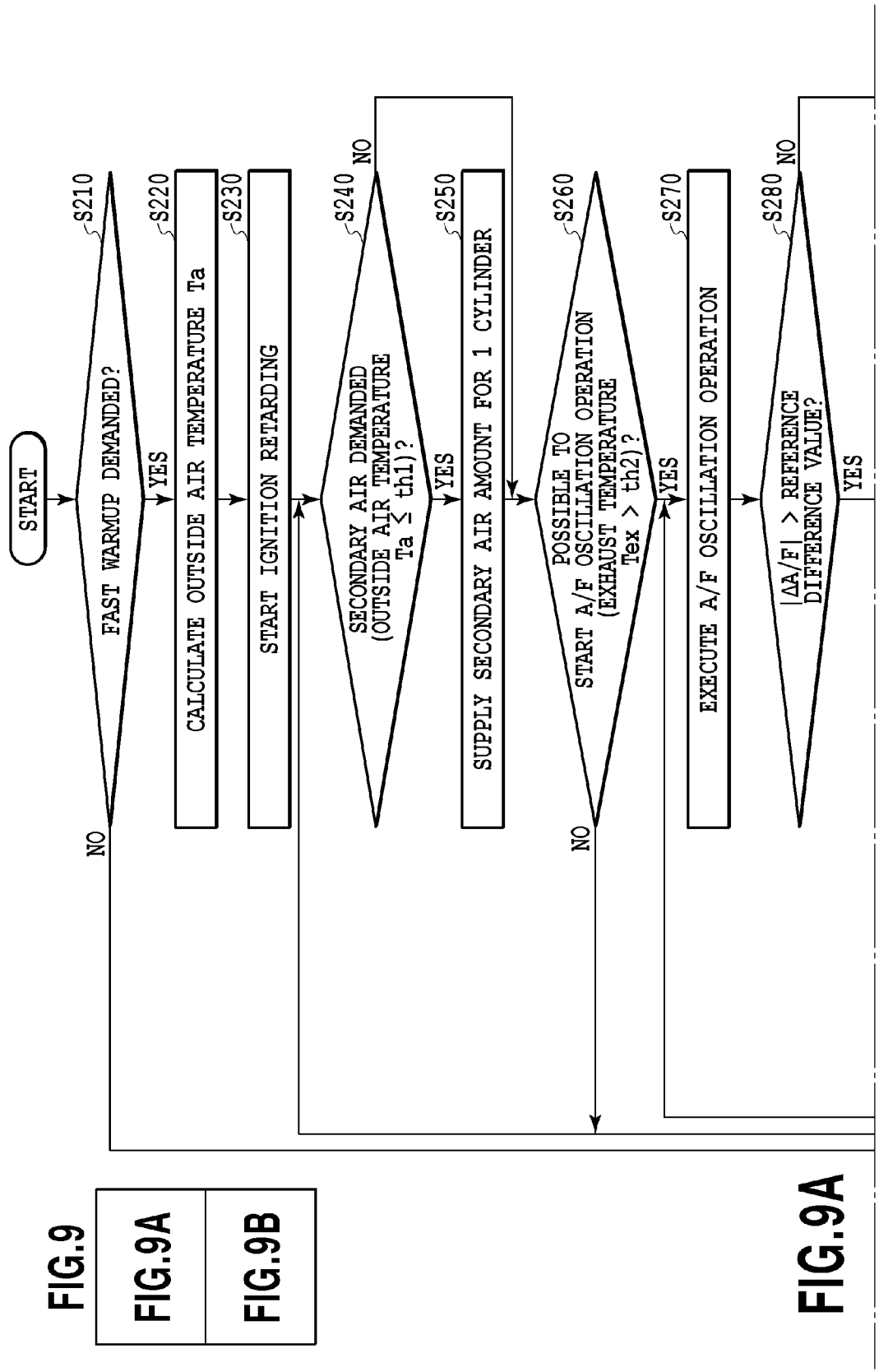

INTERNAL COMBUSTION ENGINE CONTROL DEVICE

CROSS REFERENCES TO RELATED APPLICATIONS

This application claims the benefit of Japanese Patent Applications No. 2014-091300, filed Apr. 25, 2014, and No. 2015-027705, filed Feb. 16, 2015, which are hereby incorporated by reference wherein in their entirety.

BACKGROUND OF THE INVENTION

Field of the Invention

The present disclosure relates to an internal combustion engine control device, and more particularly, to a device that has a function of controlling a fuel injection amount to promote warmup of a catalyst.

Description of the Related Art

In the related art, control of a fuel injection amount is conducted immediately after a cold start of an internal combustion engine, in order to rapidly raise the temperature of a catalyst for exhaust gas purifying up to the activation temperature. For example, in the device disclosed in Japanese Patent Laid-Open No. H08-158858 (1996), when the catalyst temperature rises to the activation temperature after the internal combustion engine starts, a dither control that alternately increases and decreases the fuel injection amount (in this specification, referred to as A/F oscillation operation) is executed.

Under such a dither control, when oxygen is supplied by lean combustion and combustible content (such as carbon monoxide (CO)) is supplied by rich combustion, CO oxidation reactions increase inside the catalyst and inside the exhaust passage near the inlet of the catalyst, the catalyst is heated with the heat produced by these oxidation reactions, and warmup of the catalyst is promoted. Since the dither control is allowed only when the catalyst temperature is at or above a predetermined temperature, an escape of unburned components such as CO and HC passing through the catalyst is minimized.

With the device disclosed in Japanese Patent Laid-Open No. 2004-270584, in order to burn exhaust gas containing uncombusted gas inside the exhaust passage, a secondary air supply device is disposed only at the exhaust ports of a subset of multiple cylinders. The cylinders that supply secondary air may be any of the cylinders.

SUMMARY OF THE INVENTION

With the device that executes a dither control as in Japanese Patent Laid-Open No. H08-158858 (1996), assuming that lean combustion is executed in the cylinder that is farthest away from the catalyst in terms of the length of the exhaust passage, the amount of heat flowing out from the relevant cylinder in the exhaust passage will decrease, and thus the temperature drop of the exhaust gas overall becomes smaller. Consequently, the exhaust energy supplied to the catalyst may be increased.

However, when the outside air temperature is low, the heat from the most distant cylinder along the exhaust passage is lost, and the temperature drop becomes larger. For this reason, the temperature drop of the exhaust overall becomes larger, and the reaction state of unburned components inside the catalyst and inside the exhaust passage near the inlet of the catalyst becomes unstable. Consequently, there is a risk that the catalyst temperature may fall and emissions may be degraded.

The present disclosure has been devised in order to solve problems like the above, and takes as an objective thereof to minimize the degradation of emissions caused by the loss of exhaust gas heat from the exhaust passage.

Solution to Problem

A first aspect of the present disclosure is an internal combustion engine control device comprising:

an internal combustion engine that includes a catalyst device in an exhaust passage; and a controller programmed to control the internal combustion engine, wherein the controller is further programmed to:

execute A/F oscillation operation in which lean combustion is conducted in at least one cylinder and rich combustion is conducted in at least one other cylinder, detect a reaction state between rich gas and lean gas at a detection point inside the exhaust passage on an upstream side of the catalyst device, on the basis of a predetermined physical amount of exhaust gas of the internal combustion engine, and change a combustion state assignment for at least one of the cylinders from lean combustion to rich combustion, or from rich combustion to lean combustion, on the basis of the reaction state.

According to this aspect, the controller detects the reaction state between rich gas and lean gas at a detection point inside the exhaust passage on the upstream side of the catalyst device, and in addition, changes the assignment of cylinders conducting lean combustion and cylinders conducting rich combustion on the basis of the reaction state. Consequently, the assignment of a combustion state to each cylinder may be changed to a configuration with a more stable reaction state, and thus it is possible to minimize the worsening of emissions caused by exhaust gas losing heat along the exhaust passage.

More preferably, the controller is further programmed to assign, if the reaction state is less than a predetermined value, a combustion state so that rich combustion is conducted by a cylinder that is farthest away from the catalyst device in terms of a length of the exhaust passage, and lean combustion is conducted by at least one cylinder closer to the catalyst device than the cylinder that is farthest away.

In another aspect of the present disclosure, the controller is further programmed to forbid the change if an intake air amount is greater than a predetermined value.

If the change between the cylinders conducting lean combustion and the cylinders conducting rich combustion is conducted when there is a large intake air amount, there is a risk of producing significant torque fluctuation. Conversely, in this aspect, when the intake air amount is greater than a predetermined value, the change between the cylinders conducting lean combustion and the cylinders conducting rich combustion is forbidden, and thus torque fluctuation caused by such a change may be minimized.

In another aspect of the present disclosure, the controller is further programmed to start the A/F oscillation operation on a condition that the reaction state has become equal to or greater than a first reference value (th2).

In this aspect, the A/F oscillation operation is started on the condition that the reaction state has become equal to or greater than a first reference value (th2), thereby promoting reactions with unburned components at the detection point.

Since the detection point is farther upstream than the catalyst, the temperature may be made to rise more rapidly. Consequently, according to this aspect, it becomes possible to start A/F oscillation operation sooner compared to the case of inducing reactions in the catalyst or the vicinity thereof.

In another aspect of the present disclosure, the internal combustion engine further includes a secondary air supplier that supplies secondary air to an exhaust passage on the upstream side of the detection point, and the controller is further programmed to control a supply amount of the secondary air from the secondary air supplier, so that the supply amount of the secondary air increases as the reaction state rises.

In this aspect, by increasing the supply amount of the secondary air, catalyst warmup may be sped up. In addition, since a small amount of secondary air is supplied even when the temperature of the exhaust confluent part is comparatively low, the supply of the secondary air may be started comparatively early, thereby speeding up catalyst warmup.

In another aspect of the present disclosure, the controller is further programmed so that, if the reaction state is less than or equal to a second reference value (th4), the supply amount of the secondary air is set to a first supply amount, and if the reaction state is greater than the second reference value (th4), the supply amount of the secondary air is set to a second supply amount that is greater than the first supply amount.

In this aspect, the anticipated advantageous effects may be obtained from the present disclosure with a simple configuration.

In another aspect of the present disclosure, the secondary air supplier is provided only in a subset of multiple branch pipes extending from each cylinder to an exhaust confluent part in the exhaust passage.

In this aspect, the secondary air supplier occupies little space and has an effective space factor.

The physical amount according to the present disclosure may also be a degree of variation in exhaust air-fuel ratio between a cylinder assigned to lean combustion and a cylinder assigned to rich combustion. Preferably, the controller is further programmed so that if the degree of variation in exhaust air-fuel ratio is greater than a reference value, the controller detects that the reaction state is less than a predetermined value.

The physical amount according to the present disclosure may also be an exhaust temperature. Preferably, the controller is further programmed so that if the exhaust temperature is lower than a reference value, the controller detects that the reaction state is less than a predetermined value.

Preferably, the detection point is provided in an exhaust confluent part where branch passages from each cylinder converge in the exhaust passage.

Further features of the present invention will become apparent from the following description of exemplary embodiments (with reference to the attached drawings).

BRIEF DESCRIPTION OF THE DRAWINGS

FIG. 4 is a diagram showing the relationship between FIG. 4A and FIG. 4B;

FIG. 4A and FIG. 4B are flowcharts illustrating a catalyst warmup process according to the first embodiment of the present disclosure;

FIG. 9 is a diagram showing the relationship between FIG. 9A and FIG. 9B;

FIG. 9A and FIG. 9B are flowcharts illustrating a catalyst warmup process according to the second embodiment of the present disclosure.

DESCRIPTION OF THE EMBODIMENTS

Hereinafter, preferred embodiments of the present disclosure will be described with reference to the drawings.

First Embodiment

Overall Configuration

Figure 1:
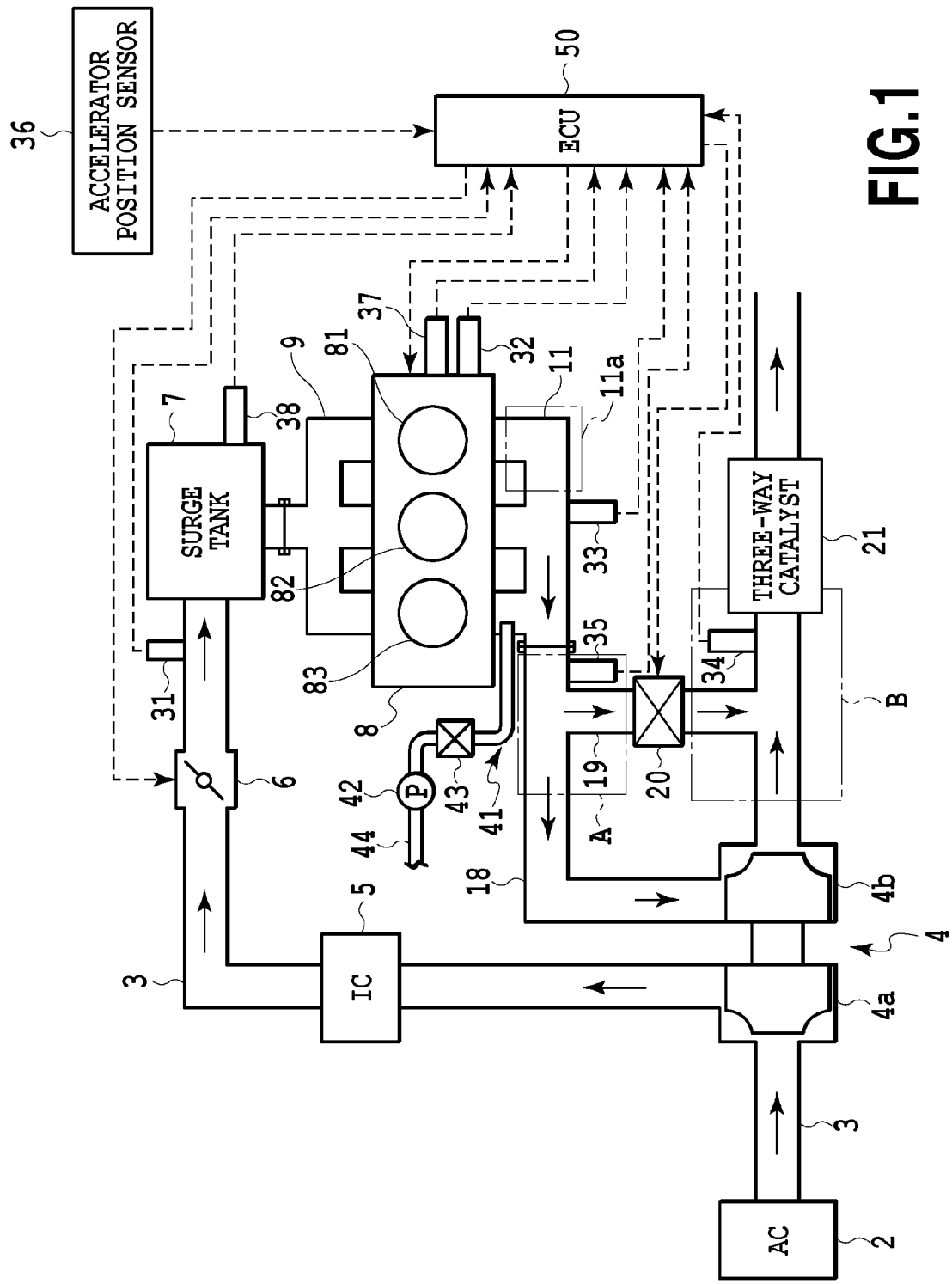
FIG. 1 is a schematic diagram illustrating a configuration of a vehicle to which is applied an internal combustion engine control device according to a first embodiment of the present disclosure.

FIG. 1 is a schematic diagram illustrating a configuration of a vehicle to which is applied an internal combustion engine control device according to the first embodiment of the present disclosure. Note that in FIG. 1, solid arrows indicate the flow of gas, while dashed arrows indicate the input and output of signals.

In FIG. 1, a vehicle is equipped with an air cleaner (AC) 2, an intake passage 3, a turbocharger 4, an intercooler (IC) 5, a throttle valve 6, a surge tank 7, an engine (internal combustion engine) 8, an exhaust passage 18, a bypass passage 19, a wastegate valve 20, a three-way catalyst 21, an airflow meter 31, a coolant temperature sensor 32, an oxygen sensor 33, an A/F sensor 34, an exhaust temperature sensor 35, an accelerator position sensor 36, a crank angle sensor 37, an intake temperature sensor 38, and an electronic control unit (ECU) 50. The engine 8 is a straight-three reciprocating gasoline engine. However, the present disclosure may be applied to other types of multi-cylinder internal combustion engines, and in the case of a V6 engine, for example, may be independently applied to both of the two banks (that is, the cylinder groups).

The air cleaner 2 filters air acquired from the outside (intake), and supplies filtered air to the intake passage 3. Inside the intake passage 3, the compressor 4a of the turbocharger 4 is disposed, and intake is compressed (supercharged) by the rotation of the compressor 4a. Additionally, the intercooler 5 that cools intake and the throttle valve 6 that regulates the amount of intake to supply it to the engine 8 are provided inside the intake passage 3.

Intake passing through the throttle valve 6 is first stored inside the surge tank 7 formed on the intake passage 3, and after that, flows into multiple cylinders 81, 82, and 83 included in the engine 8 via an intake manifold 9. The engine 8 produces motive power by combusting an air-fuel mixture containing supplied intake air and fuel inside the cylinders. Exhaust gas produced by the combustion inside the engine 8 is discharged into the exhaust passage 18 via an exhaust manifold 11. Various control of the engine 8 is conducted with control signals supplied from the ECU 50. Such control includes those of ignition timing, fuel injection amount, and fuel injection timing.

Figure 2:
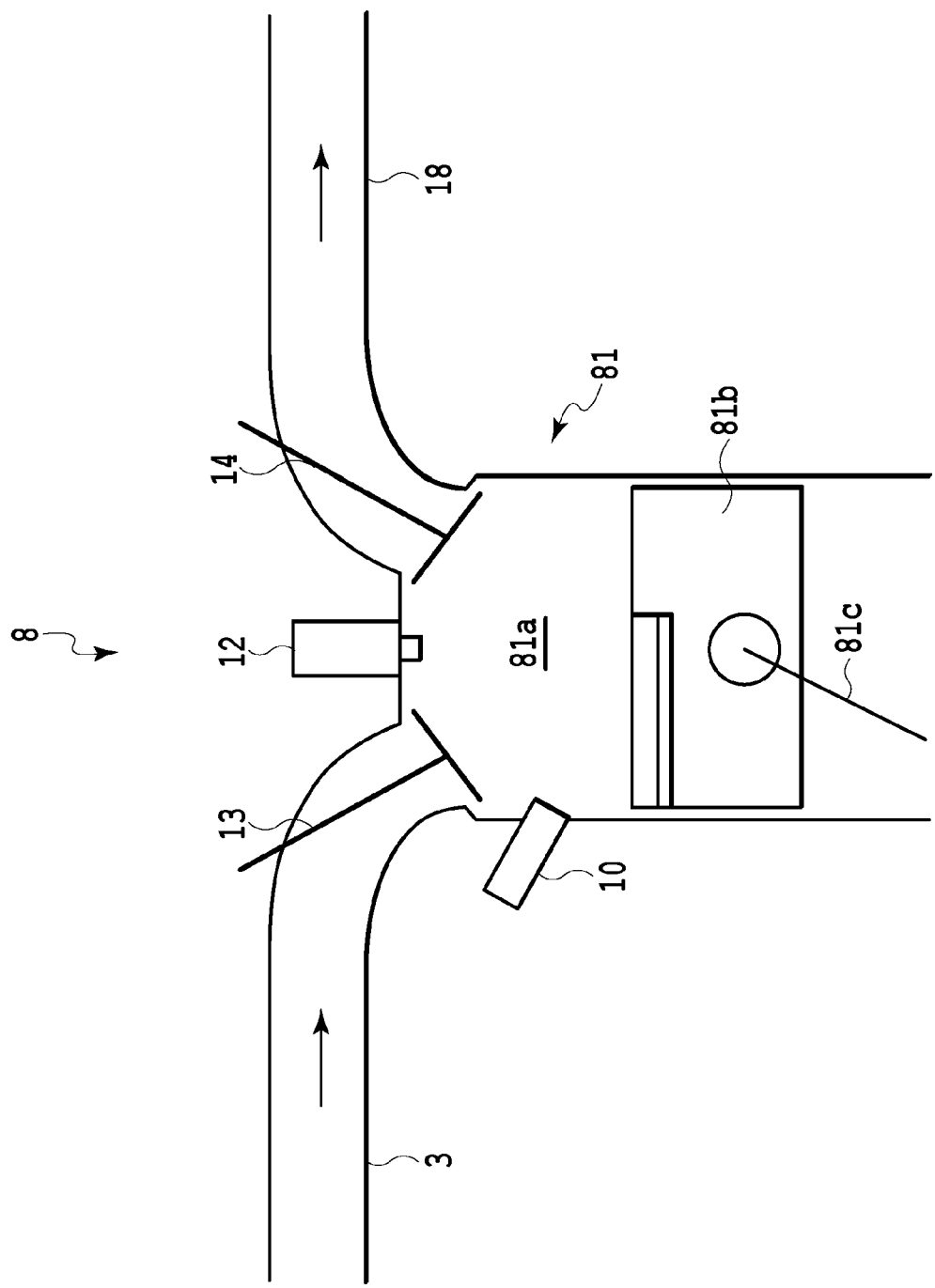
FIG. 2 is a conceptual diagram illustrating a diagrammatic configuration of an engine.

A specific configuration of the engine 8 will be described with reference to FIG. 2. The engine 8 primarily includes cylinder 81, 82 and 83, fuel injectors 10, spark plugs 12, intake valves 13, and exhaust valves 14. Note that although the engine 8 includes multiple cylinders 81, 82, and 83, FIG. 2 will be used to describe only one cylinder 81 for the sake of convenience. The configuration of the other cylinders 82 and 83 and surrounding components is similar to that of the cylinder 81.

The fuel injector 10 is provided in the cylinder 81, and directly injects fuel into the combustion chamber 81a of the cylinder 81 (in-cylinder injection). The fuel injector 10 is controlled with control signals supplied from the ECU 50. In other words, control of the fuel injection amount and the like is executed by the ECU 50. Note that instead of or in addition to the fuel injector 10 that conducts in-cylinder injection (direct injection), a fuel injector that conducts port injection may also be used in the engine 8.

Intake air from the intake passage 3 and fuel from the fuel injector 10 are supplied to the combustion chamber 81a of the cylinder 81. Inside the combustion chamber 81a, the air-fuel mixture of the supplied air and fuel is combusted by being ignited with a spark from the spark plug 12. In this case, a piston 81b conducts reciprocating motion due to the combustion, the reciprocating motion is transferred to a crankshaft (not illustrated) via a conrod 81c, and the crankshaft revolves. Note that the spark plug 12 is controlled with control signals supplied from the ECU 50. In other words, control of the ignition timing is executed by the ECU 50.

Additionally, the intake valve 13 and the exhaust valve 14 are disposed in the cylinder 81. The intake valve 13 opens and closes to control the connection/disconnection between the intake passage 3 and the combustion chamber 81a. Also, the exhaust valve 14 opens and closes to control the connection/disconnection between the exhaust passage 18 and the combustion chamber 81a.

Returning to FIG. 1, other structural elements included in the vehicle will be described. Exhaust gas discharged from the engine 8 causes a turbine 4b of the turbocharger 4 provided in the exhaust passage 18 to rotate. The rotary torque of the turbine 4b is transmitted to the compressor 4a inside the turbocharger 4, and the resulting rotation of the compressor 4a compresses (supercharges) intake air passing through the turbocharger 4.

Connected to the exhaust passage 18 is a bypass passage 19 that bypasses the upstream side and the downstream side of the turbocharger 4. The wastegate valve 20 is provided on this bypass passage 19. When the wastegate valve 20 is fully closed, exhaust gas flows into the turbocharger 4, and does not flow through the bypass passage 19. Conversely, when the wastegate valve 20 is fully opened, exhaust gas also flows into the bypass passage 19 as well. For this reason, an increase in the rotation rate of the compressor 4a is suppressed, and the supercharging by the turbocharger 4 is suppressed. Control of the opening and closing of the wastegate valve 20 is conducted by the ECU 50.

Additionally, the three-way catalyst 21 that has a function of purifying exhaust gas is provided on the exhaust passage 18. Specifically, the three-way catalyst 21 is a catalyst containing precious metals such as platinum or rhodium as an active component, and has a function of removing substances such as nitrogen oxides (NOx), carbon monoxide (CO), and hydrocarbon (HC) present in exhaust gas. In addition, the exhaust gas purifying performance of the three-way catalyst 21 varies depending on the temperature. Specifically, the exhaust gas purifying performance rises when the three-way catalyst 21 is at a temperature near the activation temperature. For this reason, at times of low temperature, such as at a cold start, it is necessary to raise the temperature of the three-way catalyst 21 up to the activation temperature. Note that the type of catalyst is not limited to the three-way catalyst 21. Various types of catalysts may be used, and those that require warmup are particularly suitable.

The airflow meter 31 is provided in the intake passage 3, and detects an intake air amount KL. The coolant temperature sensor 32 detects the temperature of coolant that cools the engine 8 (hereinafter called the "engine coolant temperature"). The oxygen sensor 33 is provided on the exhaust passage 18, and detects the concentration of oxygen present in exhaust gas. The oxygen sensor 33 has a property in which the output value changes abruptly at the stoichiometric point. Generally, the output voltage becomes lower than the stoichiometric-equivalent value when the exhaust air-fuel ratio is leaner than the stoichiometric point, and becomes higher than the stoichiometric-equivalent value when the exhaust air-fuel ratio is richer than the stoichiometric point. The A/F sensor 34 is provided in a vicinity B of the upstream end of the three-way catalyst 21 in the exhaust passage 18, and detects the air-fuel ratio of exhaust gas. The A/F sensor 34 is a thimble-type sensor using a zirconia element, for example, and outputs an electrical signal whose magnitude is generally proportional to the detected exhaust air-fuel ratio.

The exhaust temperature sensor 35 is made up of a thermocouple or the like, and detects a temperature Tex in an exhaust confluent part A. Herein, the exhaust confluent part A is the confluent point or downstream side of the confluent point of the branch pipes from all cylinders in the exhaust manifold 11, and refers to the area of the branch point of the bypass passage 19 or the area on the upstream side of the branch point.

The accelerator position sensor 36 detects the accelerator position from the driver. The crank angle sensor 37 is provided near the crankshaft of the engine 8, and detects the crank angle. The intake temperature sensor 38 is provided in the surge tank 7, and detects the intake temperature. The detected values detected by these various sensors are supplied to the ECU 50 as detection signals.

The engine 8 is provided with a secondary air supply passage 41 as secondary air supply means. An air pump 42 that compresses air and a secondary air regulation valve 43 are connected to the secondary air supply passage 41. An air introduction passage 44 that branches off from the intake passage 3 on the upstream side of the compressor 4a is connected to the air pump 42. The secondary air regulation valve 43 is controlled by the ECU 50 according to the operating state of the engine or the state of the exhaust purification device, thereby controlling the turning on/off as well as the flow rate of secondary air supply.

The flow rate of air compressed by the air pump 42 is measured by the secondary air regulation valve 43, and the air passes through the secondary air supply passage 41 and is injected into the exhaust passage 18 as secondary air from a secondary air supply port 45.

The leading end of the secondary air supply passage 41 supplies secondary air only to the exhaust passage from the #3 cylinder 83, or in other words, to the branch pipe connecting to the #3 cylinder 83 in the exhaust manifold 11. The #3 cylinder 83 is the cylinder that is closest to the three-way catalyst 21 in terms of the length of the exhaust passage. The secondary air supply passage 41 is preferably installed at a position that is as close to the exhaust port as possible, in order to inject secondary air into exhaust gas at the highest temperature possible and burn uncombusted components present in the exhaust gas.

Note that by supplying secondary air to the #3 cylinder 83 which is the cylinder closest to the three-way catalyst 21 in terms of the length of the exhaust passage 18, the vicinity of the convergence part where the exhaust gas from all cylinders converges may be suitably heated, and reactions with CO and O2 (oxidation reactions) in the vicinity of the convergence part may be promoted. However, the cylinder to receive the supply of secondary air may also be a cylinder other than the #3 cylinder 83, and in addition, the number of cylinders to receive the supply of secondary air may be increased to multiple or all cylinders. In the case of supplying secondary air to only one or more specific cylinders (a subset of cylinders), assume that the secondary air supply passage 41 is connected in the region between the exhaust port of each of the cylinders 81 to 83 and the confluent part that converges with the other cylinders in the exhaust passage 18.

The ECU 50 includes components such as a CPU, ROM, RAM, and A/D converter (not illustrated). The ECU 50 conducts internal vehicle control on the basis of outputs supplied from various sensors inside the vehicle. In the present embodiment, the ECU 50 primarily controls the wastegate valve 20 and the fuel injector 10. Specifically, when a predetermined warmup execution condition is established, the ECU 50 first puts the wastegate valve 20 in an open state, retards the ignition timing, and if necessary, executes the supply of secondary air to the exhaust passage 18 using the secondary air supply passage 41. Furthermore, if necessary, the ECU 50 executes operation according to a mode that oscillates the air-fuel ratio so that lean combustion and rich combustion are alternated (hereinafter referred to as "A/F oscillation operation"). Such A/F oscillation operation is conducted to achieve faster warmup of the catalyst while also suitably minimizing the escape of substances such as CO and HC from the catalyst. Also, while executing the A/F oscillation operation, the ECU 50 controls the oscillation of the air-fuel ratio amplitude between rich combustion and lean combustion (hereinafter referred to as the "the magnitude of air-fuel ratio oscillation amplitude") on the basis of the reaction state of rich gas and lean gas on the upstream side of the turbocharger 4.

[A/F Oscillation Operation]

Next, the A/F oscillation operation executed by the ECU 50 above will be described. In the present embodiment, the A/F oscillation operation is executed to achieve faster warmup of the catalyst 21 at a cold start or the like.

Figure 3:
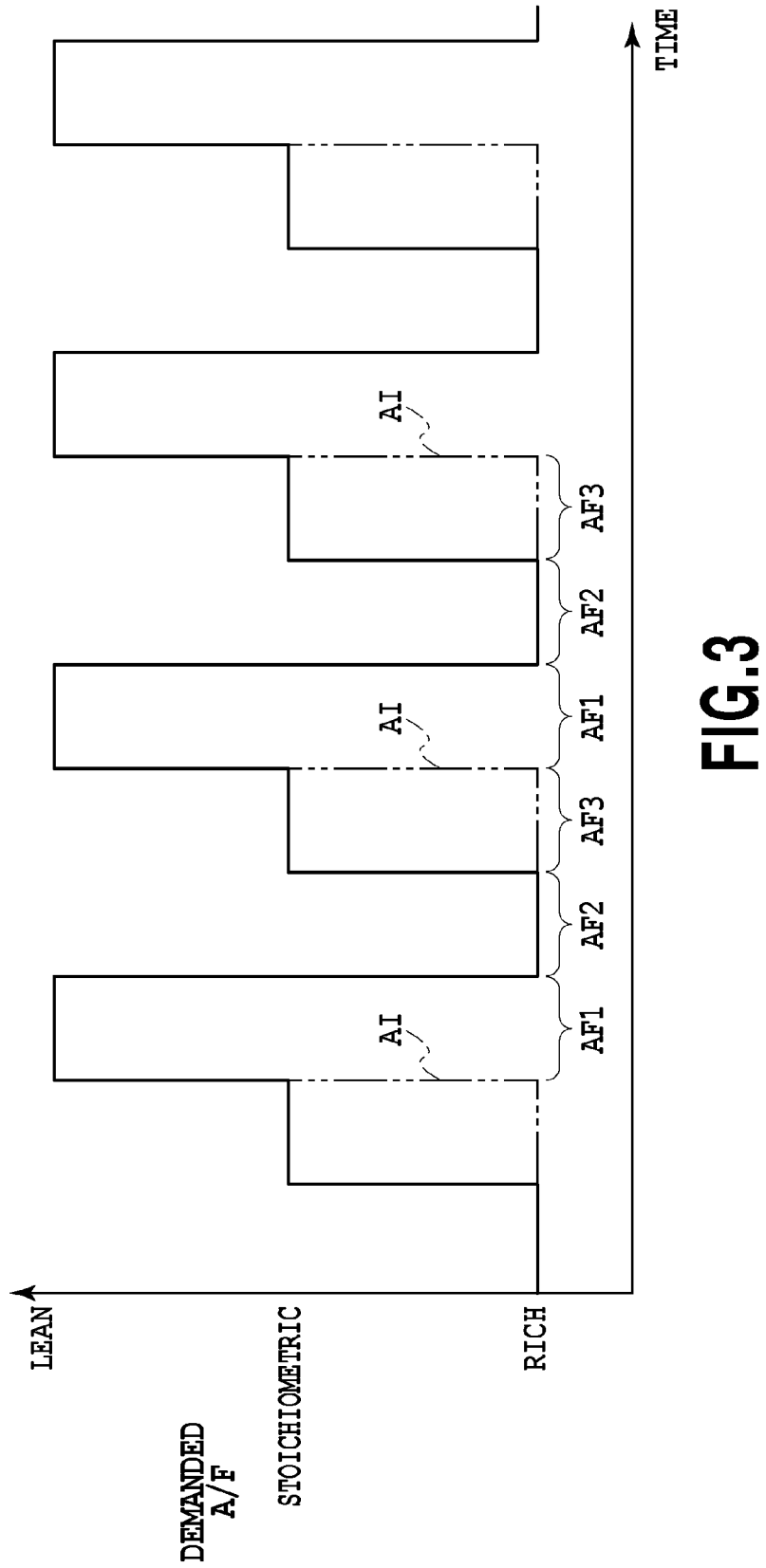
FIG. 3 is a timing chart illustrating an example of changes in the requested A/F during execution of A/F oscillation operation.

At this point, basic A/F oscillation operation will be described with reference to FIG. 3. FIG. 3 illustrates time on the horizontal axis and the air-fuel ratio (A/F) on the vertical axis. Note that FIG. 3 is a graph illustrating change in the target air-fuel ratio when executing A/F oscillation operation.

As illustrated in FIG. 3, in A/F oscillation operation, control is conducted to oscillate the air-fuel ratio for each of the cylinders 81, 82, and 83 in order of ignition, so as to alternate between lean combustion and rich combustion. In the present embodiment, in a first Operating state which is the basic state, the air-fuel ratio AF1 of the #1 cylinder 81 is lean, the air-fuel ratio AF2 of the #2 cylinder 82 is rich, and the air-fuel ratio AF3 of the #3 cylinder 83 is stoichiometric. Oscillation of the air-fuel ratio is conducted by increasing and decreasing the fuel injection amount. Between the cylinders configured with a lean air-fuel ratio (lean cylinders) and the cylinders configured with a rich air-fuel ratio (rich cylinders), the air-fuel ratio (A/F) is configured to roughly symmetric values centered on the stoichiometric value (for example, an arbitrary value between 14.5 and 15 by mass ratio). However, operation may also be conducted so that the air-fuel ratio oscillates about a reference air-fuel ratio other than the stoichiometric value.

In a second operating state executed during low combustion, the assignment of lean cylinders and rich cylinders is reversed, so that the air-fuel ratio AF1 of the #1 cylinder 81 is rich, the air-fuel ratio AF2 of the #2 cylinder 82 is lean, and the air-fuel ratio AF3 of the #3 cylinder 83 is stoichiometric.

In both the first and second operating states, in the case of supplying secondary air, the air-fuel ratio AF3 of the #3 cylinder 83, which is the cylinder that receives the supply of secondary air, is set to rich. The air-fuel ratio AF3 of the #3 cylinder 83 when supplying secondary air in the first operating state is as illustrated by the two-dash chain line AI in FIG. 3.

When executing such A/F oscillation operation, lean gas (such as oxygen (O2)) is supplied to the exhaust passage 18 during lean combustion, while rich gas (such as carbon monoxide (CO)) is supplied to the exhaust passage 18 during rich combustion. Consequently, reactions between CO and O2 (oxidation reactions) inside the exhaust passage 18 may be increased, and the three-way catalyst 21 may be heated with the heat produced from such oxidation reactions, thereby promoting warmup of the catalyst (such reactions inside the exhaust passage 18 are hereinafter designated "after-burning").

Note that A/F oscillation operation is established by conducting lean combustion in at least a part of the cylinders, while also conducting rich combustion in at least one other cylinder. Lean combustion and rich combustion are preferably alternated. If the engine 8 has four cylinders, in which the #4 cylinder is a cylinder that receives the supply of secondary air and the ignition sequence is "#1-#3-#4-#2" by cylinder number, the air-fuel ratio or combustion type may be assigned as "#1 cylinder: rich, #3 cylinder: lean, #4 cylinder: stoichiometric, #2 cylinder: lean", for example. Also, instead of a configuration that switches between lean combustion and rich combustion after every single cylinder in the ignition order, a configuration that switches after multiple cylinders is also acceptable.

In the present embodiment, the ECU 50 starts executing A/F oscillation operation when the temperature on the upstream side of the turbocharger 4 exceeds a predetermined reference value, or in other words, when the temperature on the upstream side of the turbocharger 4 reaches an approximate temperature at which CO may be burned. In this way, by starting A/F oscillation operation on the condition that the temperature on the upstream side of the turbocharger 4 exceeds a predetermined reference value, CO produced by the A/F oscillation operation may be burned at a higher probability (that is, reactions between CO and O2, or in other words after-burning, may be conducted at a higher probability) in the area A on the upstream side of the turbocharger 4 (see FIG. 1).

The magnitude of the air-fuel ratio oscillation amplitude may also be changed on the basis of the temperature inside the exhaust passage 18 on the upstream side of the turbocharger 4. Specifically, the ECU 50 may set the difference obtained between the respective median values of the fuel injection amount for the lean cylinders and the rich cylinders according to the temperature on the upstream side of the turbocharger 4. For example, if the temperature on the upstream side of the turbocharger 4 falls, the magnitude of the air-fuel ratio oscillation amplitude may be changed to a smaller value, thereby making it possible to keep reactions on the upstream side of the turbocharger 4 in a suitable state.

In the present embodiment, the temperature Tex of the exhaust confluent part A is directly detected by installing the exhaust temperature sensor 35 in the exhaust confluent part A. However, a temperature T may also be estimated on the basis of parameters indicating the operating state of the vehicle, such as at least one from among the cumulative value of intake airflow detected by the airflow meter 31 and the fuel injection amount, for example. The estimated value may be corrected on the basis of at least one from among the cylinder pressure, the outside air temperature Ta, the engine coolant temperature, the intake air temperature, the operating pattern (the change over time of the demanded load and engine speed), the catalyst inlet exhaust temperature, and the pressure of the exhaust confluent part A. The cylinder pressure may be detected by a cylinder pressure sensor (not illustrated) provided inside the combustion chamber. The engine coolant temperature may be detected by the coolant temperature sensor 32. The intake air temperature may be detected by the intake temperature sensor 38. The catalyst inlet exhaust temperature may be detected by a catalyst inlet exhaust temperature sensor (not illustrated) provided in the vicinity B of the upstream end of the three-way catalyst 21. The pressure of the exhaust confluent part A may be detected by a pressure sensor (not illustrated) provided in the exhaust confluent part A.

[Catalyst Warmup Process]

Figure 4B:
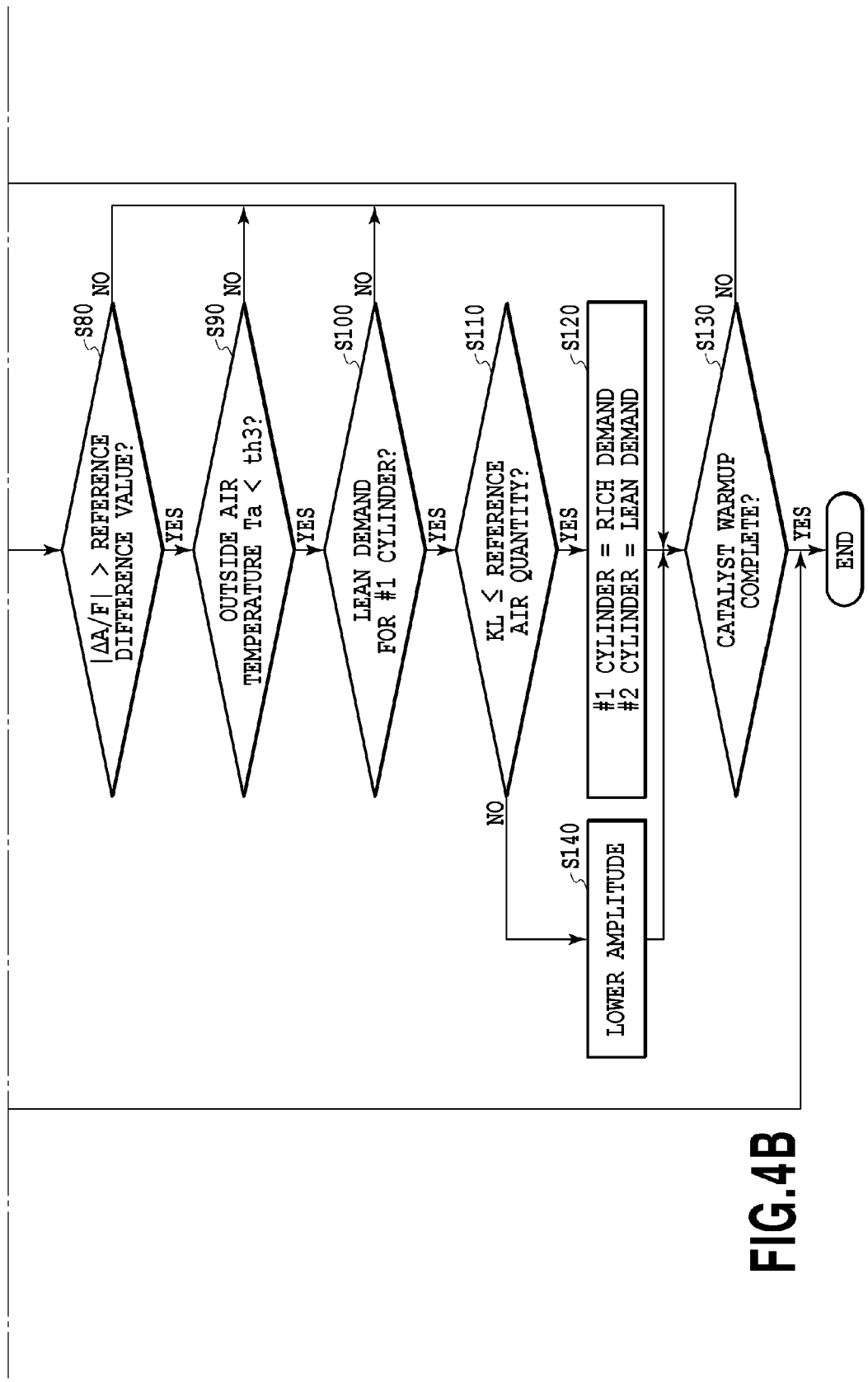

FIGS. 4A and 4B are flowcharts illustrating a catalyst warmup processing routine according to the first embodiment. The process is executed by the ECU 50 on the condition of determining that the engine 8 has started, which is determined on the basis of operating input of an ignition switch not illustrated in the drawings, and input of the crank angle sensor 37. The process includes the A/F oscillation operation discussed earlier.

First, in step S10, the ECU 50 determines whether or not a catalyst fast warmup demand exists. This determination is conducted on the basis of whether or not the engine coolant temperature is lower than a predetermined reference value, for example, and if lower, a fast warmup demand is judged to exist. Note that the determination may be conducted on the basis of at least one from among the engine coolant temperature, the engine oil temperature, and the catalyst temperature (any of which may be a detected value or an estimated value). If a fast warmup demand does not exist (step S10: No), the process exits the relevant routine.

If a fast warmup demand does exist (step S10: Yes), a predetermined catalyst warmup demand flag is turned on, and the process proceeds to step S20. In step S20, the ECU 50 calculates the outside air temperature Ta on the basis of the intake air temperature detected by the intake temperature sensor 38. As the outside air temperature Ta becomes lower, the temperature drop increases over the exhaust passage from the #1 cylinder 81 that is farthest away from the catalyst 21 in terms of the length of the exhaust passage 18, or in other words, over the first branch 11*a* of the exhaust manifold 11 (see FIG. 1). For this reason, the temperature drop increases for the exhaust gas overall, and the reaction state of unburned components inside the catalyst 21 and inside the exhaust passage 18 near the inlet of the catalyst 21 becomes unstable, and thus there is a risk that the catalyst temperature may fall and emissions may worsen.

Next, in step S30, the ECU 50 retards the ignition in response to the operation of turning on the catalyst warmup demand flag. The ECU 50 retards the ignition timing of the spark plug 12 by configuring a predetermined crank angle on or after top dead center. This ignition retarding causes combustion to occur on or after top dead center closer to the exhaust stroke, thereby leading high-temperature exhaust gas to the catalyst and promoting activation of the catalyst.

Next, in step S40, the ECU 50 determines whether or not a secondary air demand exists. This determination is conducted on the basis of whether or not the outside air temperature Ta is lower than a predetermined first reference temperature th1, for example, and if lower, a secondary air demand is judged to exist. If a secondary air demand does not exist (step S40: No), the processing in the following steps S50 to S70 is skipped.

If the outside air temperature Ta is lower than the first reference temperature th1, and a secondary air demand exists (step S40: Yes), the process proceeds to step S50. In step S50, the ECU 50 executes the supply of secondary air. The amount of secondary air supplied at this point is set to an amount suitable for burning exhaust gas containing uncombusted gas from the #3 cylinder 83 provided with the secondary air supply passage 41, or in other words, an amount corresponding to a single cylinder. By supplying secondary air, exhaust gas containing uncombusted gas is made to combust inside the exhaust passage 18, and the temperature of the branch pipe leading from the #3 cylinder 83 rises.

Next, in step S60, the ECU 50 determines whether or not the temperature Tex of the exhaust confluent part A on the upstream side of the turbocharger 4 and the wastegate valve 20 is higher than a predetermined second reference temperature th2. The second reference temperature th2 is defined as a temperature at which the combustion of CO present in exhaust gas (reactions between O2 and CO) is conducted at a minimum allowable level as a heat source in the exhaust confluent part A if A/F oscillation operation is started at that time with the wastegate valve 20 still open. If the temperature Tex of the exhaust confluent part A is less than or equal to the second reference temperature th2 (step S60: No), the processing in step S50 is repeated, and the supply of secondary air in the retarded ignition state is continued until the temperature Tex becomes higher than the second reference temperature th2.

If the temperature Tex of the exhaust confluent part A is higher than the second reference temperature th2 (step S60: Yes), a predetermined A/F oscillation operation demand flag is turned on, and the process proceeds to step S70. In this case, if A/F oscillation operation is started, suitable combustion of CO (reactions between O2 and CO) in the exhaust confluent part A may be anticipated. Consequently, the ECU 50 next starts A/F oscillation operation in response to a turn-on operation of the A/F oscillation operation demand flag (step S70).

As discussed above, with the A/F oscillation operation, lean combustion and rich combustion are alternated. Immediately after starting the A/F oscillation operation, the magnitude of the air-fuel ratio oscillation amplitude is gradually expanded from an initial value of 0, and set to a fixed target value, for example. Also, during the A/F oscillation operation, the ignition timings of the rich cylinders are retarded while the ignition timings of the lean cylinders are advanced, so as to compensate for the torque difference between the rich cylinders and the lean cylinders, and average out the torque.

Next, in steps S80 to S100, the ECU 50 determines whether or not the reaction state between the rich gas and the lean gas inside the exhaust passage 18 is low (i.e. of a small amount) due to a temperature drop in the first branch 11a caused by a low outside air temperature. The following three standards of judgment are used herein.

Figure 7:
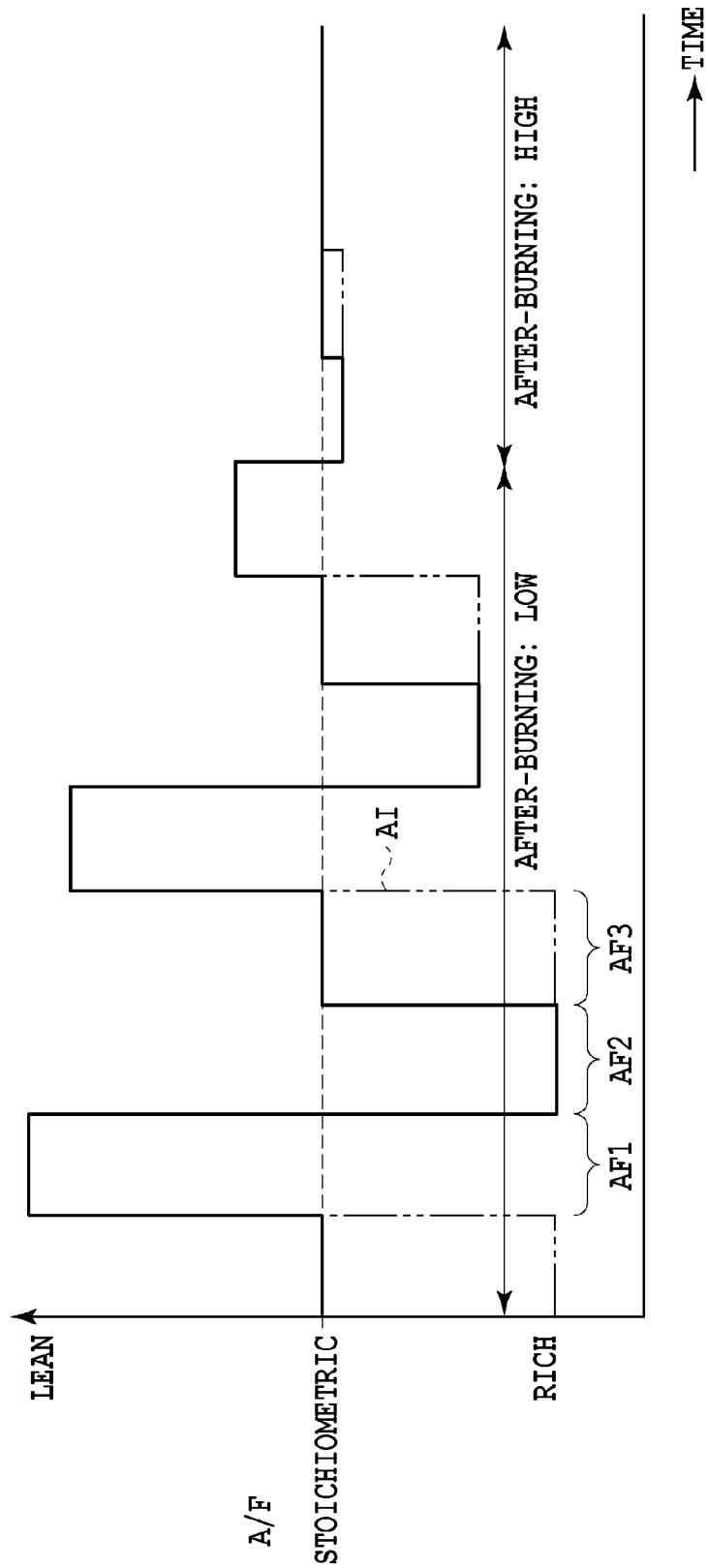
FIG. 7 is a timing chart illustrating an example of changes in the detected A/F according to the first embodiment of the present disclosure.

(i) Whether or not the air-fuel ratio difference value ΔA/F in the vicinity B of the upstream end of the catalyst 21 is greater than a reference difference value (step S80) at absolute value. As illustrated in FIG. 7, when CO combustion (reactions between O2 and CO) is high (i.e. of a large amount) in the exhaust confluent part A, the amplitude of the air-fuel ratio at the installation point of the A/F sensor 34 farther downstream (the vicinity B of the upstream end of the three-way catalyst 21) becomes comparatively small. Consequently, it is possible to judge whether or not reactions are high in the exhaust confluent part A, on the basis of the amplitude of the air-fuel ratio detected by the A/F sensor 34, or in other words, the degree of variation of the exhaust air-fuel ratio between the cylinders assigned to lean combustion and the cylinders assigned to rich combustion. The air-fuel ratio detection point in this case is preferably at the exhaust confluent part A or farther downstream, and upstream from the three-way catalyst 21. Specifically, the ECU 50 reads the detected value of the A/F sensor 34 for every ignition timing between adjacent cylinders on the basis of the detected value of the crank angle sensor 37, subtracts the previous value from the latest value to calculate the air-fuel ratio difference value ΔA/F, and judges whether or not its absolute value is greater than a predetermined reference difference value, for example. In the case of a positive judgment, or in other words if the absolute value of the air-fuel ratio difference value ΔA/F is greater than the reference difference value, reactions in the exhaust confluent part A (after-burning) may be considered to be low. In the case of a negative judgment, reactions in the exhaust confluent part A (after-burning) is high, and thus steps S90 to S120 are skipped.

(ii) Whether or not the outside air temperature Ta is lower than a predetermined third reference temperature th3 (step S90). The predetermined third reference temperature th3 is a value for specifying that the cause of low reactions is a low outside air temperature. The third reference temperature th3 may be either the same value as the first reference temperature discussed earlier, or a different value. In the case of a positive judgment, or in other words if the outside air temperature Ta is lower than the predetermined third reference temperature th3, the cause of low reactions may be considered to be a low outside air temperature. In the case of a negative judgment, the cause of, low reactions is not a low outside air temperature, and thus steps S100 and S120 are skipped.

(iii) Whether or not the #1 cylinder 81 farthest away from the catalyst 21 in terms of the length of the exhaust passage 18 is selected as a lean cylinder (step S100). In the case of a positive judgment, the cause of low reactions may be considered to be a temperature drop in the first branch 11a, which is the exhaust passage from the #1 cylinder 81 that is farthest away. In the case of a negative judgment, the cause of low reactions is not a temperature drop in the first branch 11a, and thus the next step S120 is skipped.

Subsequently, a positive judgment for all of these standards of judgment (i) to (iii) means that the reaction state between rich gas and lean gas inside the exhaust passage 18 has worsened due to a temperature drop in the first branch 11a caused by a low outside air temperature. Consequently, the process proceeds to step S110.

In step S110, the ECU 50 judges whether or not the current intake air amount KL detected by the airflow meter 31 is less than or equal to a predetermined reference air amount. In the case of a positive judgment in step S110, or in other words if the intake air amount KL is less than or equal to the reference air amount, the process proceeds to step S120.

In the step S120, the ECU 50 changes the combustion state assignment for the cylinders 81 and 82. In other words, a combustion state is assigned to each of the cylinders 81 and 82 so that the #1 cylinder 81, which was a lean cylinder in the initial state, is made to conduct rich combustion, and the #2 cylinder 82, which was a rich cylinder in the initial state, is made to conduct lean combustion. Note that the assignment is not changed for the #3 cylinder 83, which was the cylinder to receive the supply of secondary air in the initial state.

In the case of a negative judgment in step S110, or in other words, if the intake air amount KL is greater than the reference air amount (step S110: No), the change of cylinder assignment in step S120 is not conducted, and the air-fuel ratio magnitude is decreased to a predetermined value (step S140).

Figure 5:
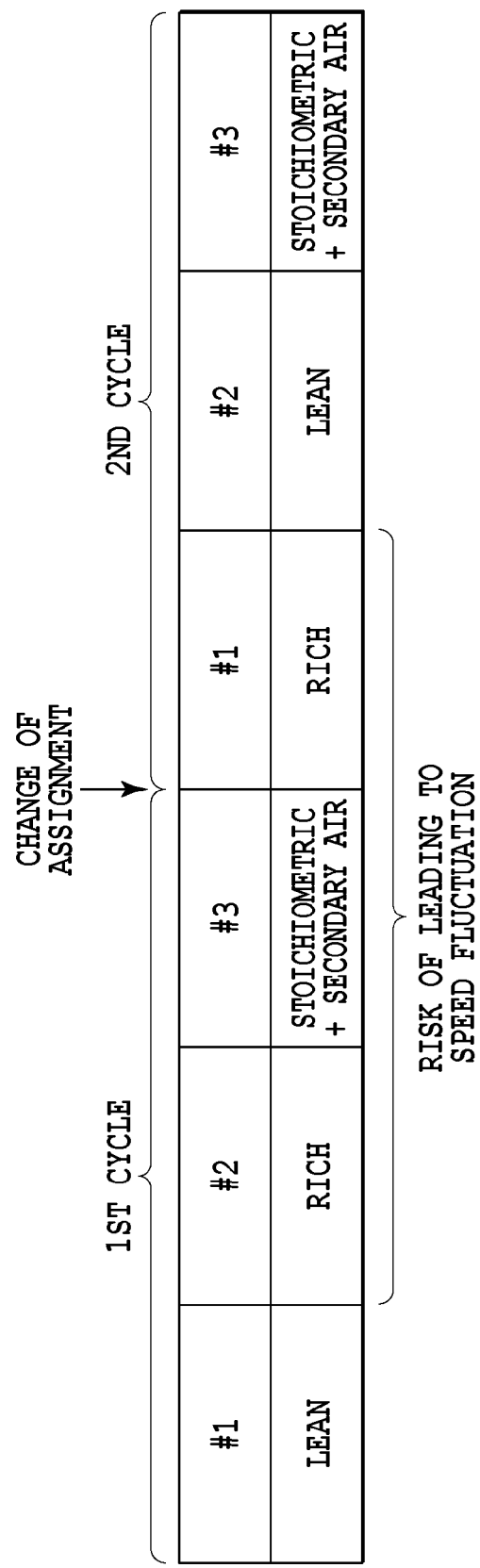
FIG. 5 is a conceptual diagram illustrating the assignment state when the cylinder assignment is changed.

As illustrated in FIG. 5, for the 3-cylinder engine 8, if the cylinder assignment is changed in step S120 between a first cycle and a second cycle, for example, rich combustion is conducted in the #2 cylinder in the first cycle, then stoichiometric combustion is conducted in the #3 cylinder, and then rich combustion is conducted again in the #1 cylinder. During low-load operation in which the intake air amount KL is comparatively small, even if there is such a succession of rich combustion (or a succession of lean combustion), the speed fluctuation may stay within tolerance when combined with the ignition timing control discussed earlier. However, during high-load operation in which the intake air amount KL is comparatively large, there is a possibility of significant speed fluctuation.

For this reason, in the present embodiment, when the intake air amount KL is greater than a reference air amount, the change of cylinder assignment in step S120 is not conducted, and in addition, the air-fuel ratio magnitude is decreased to a predetermined value (step S140). The latter action may improve the reaction state between rich gas and lean gas inside the exhaust passage 18. Such a process may be applied similarly to not only 3-cylinder engines but also engines having four cylinders or more, and may be applied to each bank of a V6 engine independently from the other bank, for example.

Finally, the ECU 50 judges whether or not catalyst warmup has completed (S130). This judgment may be made on the basis of at least one from among the cumulative value of the intake air amount detected by the airflow meter 31 and an estimated value or detected value (detected using a thermocouple or the like) of the catalyst temperature, for example. When respectively predetermined reference values are reached, a positive judgment is made, and the present routine ends. In the case of a negative judgment in step S130, the processing from step S70 to S120 and S140 is repeatedly executed until the judgment becomes positive, or in other words, until catalyst warmup finishes.

Figure 6:
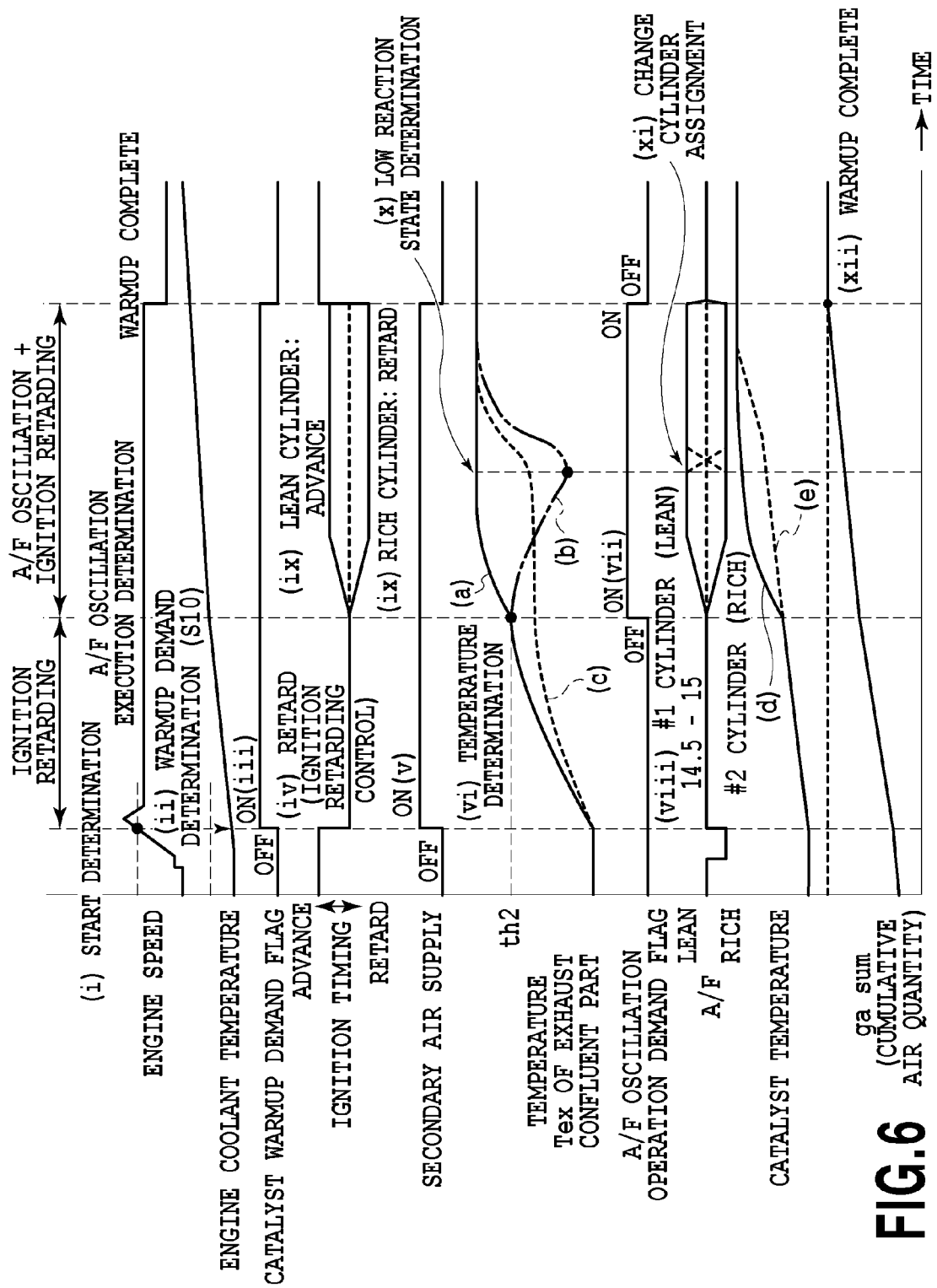
FIG. 6 is a timing chart illustrating an example of changes in respective parameters according to the first embodiment of the present disclosure.

FIG. 6 is a timing chart illustrating the operating state of each component when the above catalyst warmup process is executed. In FIG. 6, first, if the engine speed calculated from the input of the crank angle sensor 37 exceeds a start determination reference value, thereby resulting in a positive determination (i) indicating that the engine 8 has started, a judgment (ii) indicating that there is a fast warmup demand is made on the basis of the engine coolant temperature (S10). On the condition of a positive judgment at this point, the catalyst warmup demand flag is turned on (iii). The flag indicates that a catalyst warmup demand has been established, and is maintained until catalyst warmup finishes.

In response to the operation of turning on the catalyst warmup demand flag, retardation of the ignition timing (iv) is started (S30). If there is a secondary air demand (step S40: Yes), a supply of secondary air (v) is executed (S50). As a result of this supply of secondary air, the exhaust temperature Tex rapidly increases as indicated by the solid line (a) in FIG. 6. Note that in the case of a device that does not provide a supply of secondary air, it is conceivable that the exhaust temperature Tex may increase comparatively sluggishly as indicated by the curve (c) in FIG. 6.

If the temperature Tex in the exhaust confluent part A becomes larger than the second reference temperature th2 (vi), the A/F oscillation operation demand flag is turned on (vii), and this flag is maintained until catalyst warmup finishes. In response to the operation of turning on the A/F oscillation operation demand flag, A/F oscillation operation (viii) is started (S70). Specifically, the magnitude of the air-fuel ratio amplitude (that is, the respective differences of the air-fuel ratio for the lean cylinders and the rich cylinders from their median value) is gradually expanded from 0, and set to a fixed target value. While the magnitude of the air-fuel ratio amplitude is gradually increasing, the ignition timings of the lean cylinders are gradually advanced, and the ignition timings of the rich cylinders are gradually retarded (ix). As a result of this A/F oscillation operation, the exhaust temperature Tex increases further as indicated by the solid line (a) in FIG. 6.

In contrast, if the reaction state between rich gas and lean gas in the exhaust confluent part A becomes low due to a temperature drop in the first branch 11a caused by a low outside air-temperature, the exhaust temperature Tex does not increase even after starting A/F oscillation operation, as indicated by the one-dash chain line (b) in FIG. 6. Subsequently, in the case of a positive judgment in all of steps S80 to S100, or in other words, if the reaction state is determined to be low (x), the assignment of cylinders conducting lean combustion and cylinders conducting rich combustion is changed (xi) (S120). As a result, the exhaust temperature Tex starts to rise (one-dash chain line (b)).

If it is judged that catalyst warmup has completed (xii) (S130), the catalyst warmup demand flag and the A/F oscillation operation demand flag are turned off, and A/F oscillation operation is terminated. As a result of the above process, the catalyst temperature is made to increase rapidly, as indicated by the solid line (d) in FIG. 6. Note that in the case of a device that does not conduct A/F oscillation operation, it is conceivable that the catalyst temperature may increase comparatively sluggishly as indicated by the curve (e) in FIG. 6.

As above, with the first embodiment, in the engine 8 that executes A/F oscillation operation (step S70) in which lean combustion and rich combustion are alternated every cylinder, the reaction state of rich gas and lean gas inside the exhaust passage 18 on the upstream side of the catalyst 21 is detected on the basis of a predetermined physical amount of exhaust gas (steps S80 to S100). In the case of judging that the reaction state is low, the ECU 50 swaps the assignment of cylinders conducting lean combustion and cylinders conducting rich combustion, so that rich combustion is conducted by the #1 cylinder 81, which is the cylinder farthest away from the catalyst 21 in terms of the length of the exhaust passage 18, and also so that lean combustion is conducted by the #2 cylinder 82, which is a cylinder that is closer to the catalyst 21 than the cylinder that is farthest away (step S120). Consequently, the assignment of a combustion state to each of the cylinders 81, 82, 83 may be changed to a configuration with a more stable reaction state, and thus it is possible to minimize the worsening of emissions caused by exhaust gas losing heat in the first branch 11a of the exhaust passage 18.

Also, in the present embodiment, if the intake air amount KL is greater than the reference air amount (step S110: No), the change of cylinder assignment in step S120 is forbidden, thereby minimizing torque variation caused by such change.

Also, in the present embodiment, on the condition that the temperature Tex of the exhaust confluent part A has become equal to or greater than a reference value (step S60), the A/F oscillation operation is started (step S70), thereby promoting the reaction of unburned components in the exhaust confluent part A. Since the exhaust confluent part A is farther upstream than the vicinity B of upstream end of the catalyst 21, the temperature Tex may be made to rise more rapidly. Consequently, according to this configuration, it becomes possible to start A/F oscillation operation sooner compared to the case of inducing reactions in the catalyst 21 or the vicinity B of the upstream end thereof.

Second Embodiment

Next, a second exemplary embodiment of the present disclosure will be described. To speed up the warmup of the catalyst, it is effective to supply secondary air from the secondary air supply passage 41. It is desirable to install the secondary air supply passage 41 in a branch pipe at a location along the exhaust passage that is as close to a cylinder as possible, in order to raise the temperature of the supplied secondary air. However, providing a secondary air supply passage in all branch pipes may be unsuitable given the constraints on installation space. It is also possible to provide a secondary air supply passage for a subset of cylinder, such as only a single cylinder, for example, and from that secondary air supply passage, supply an amount of secondary air corresponding to all cylinders. However, unless there is a sufficient temperature field inside the exhaust passage in this case, there is a risk that reactions between CO and O2 (oxidation reactions) may not occur, the exhaust gas temperature may fall, and emissions may worsen.

Figure 8:
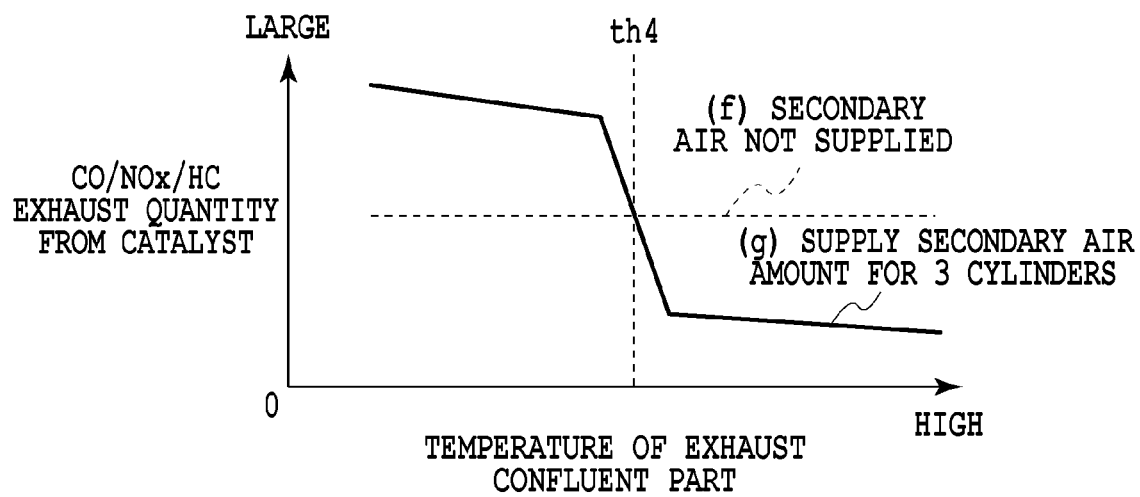
FIG. 8 is a graph illustrating the relationship between the temperature of an exhaust confluent part and the CO/NOx/HC exhaust amount from the catalyst.

For example, as illustrated in FIG. 8, in the case of supplying an amount of secondary air corresponding to three cylinders in a 3-cylinder engine, in the region where the temperature is higher than a certain value th4, the CO/NOx/HC exhaust amount (g) may be significantly reduced compared to the case of not supplying secondary air (f). However, in the region where the temperature is lower than th4, the CO/NOx/HC exhaust amount (g) increases compared to the case of not supplying secondary air (f).

Accordingly, in the second embodiment, by executing A/F oscillation operation, the temperature inside the exhaust passage is made to rise rapidly, and in addition, by increasing the supply amount of secondary air in a temperature region where secondary air may be made to react effectively with unburned components, catalyst warmup is sped up. The mechanical configuration in the second embodiment is similar to that of the above first embodiment, and thus detailed description thereof will be reduced or omitted.

Figure 9B:
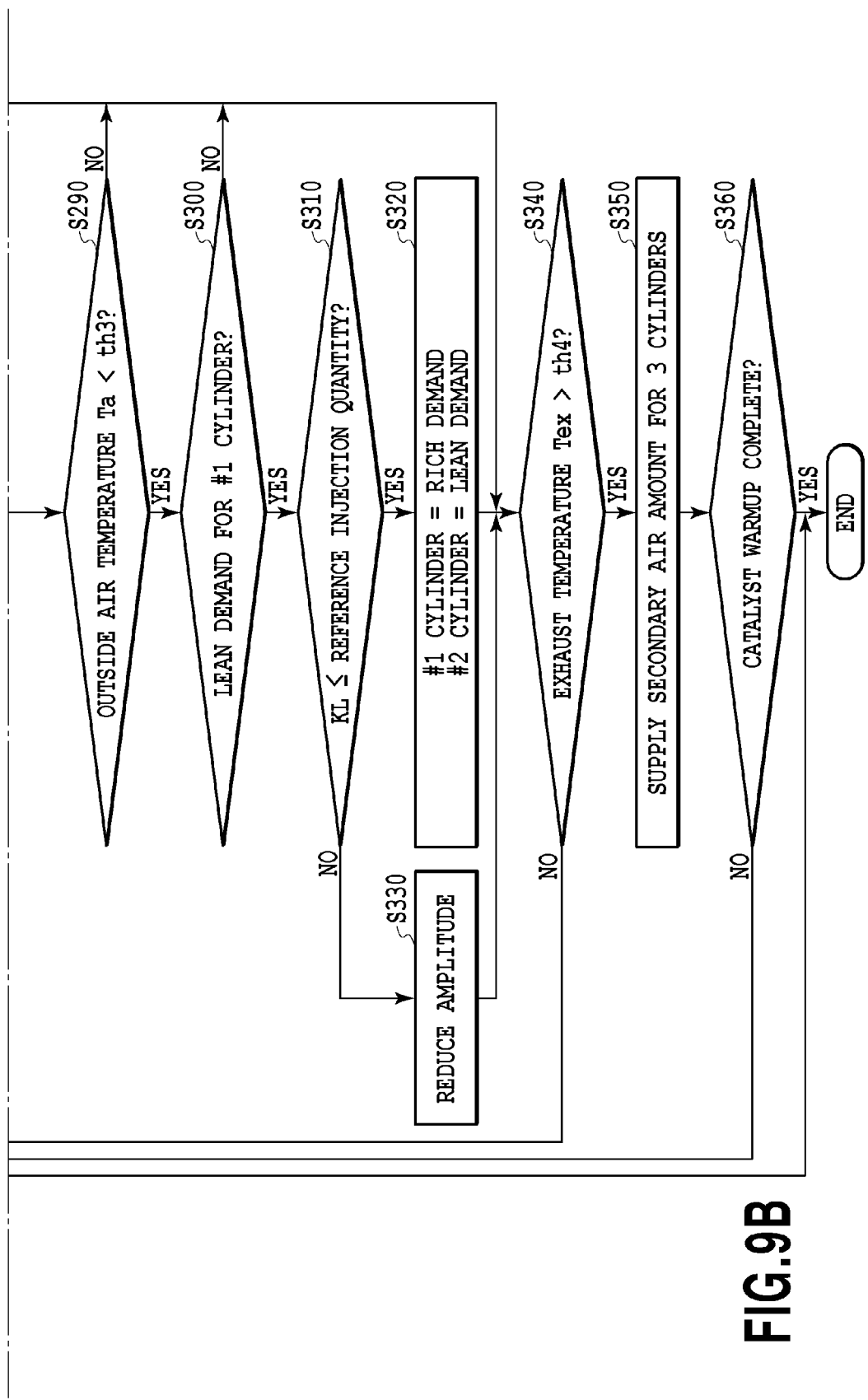

FIGS. 9A and 9B are flowcharts illustrating a catalyst warmup processing routine according to the second embodiment. The process is executed by the ECU 50 on the condition of determining that the engine 8 has started, which is determined on the basis of operating input of an ignition switch not illustrated in the drawings, and input of the crank angle sensor 37.

First, in step S210, the ECU 50 determines whether or not a catalyst fast warmup demand exists. If a fast warmup demand does exist, a predetermined catalyst warmup demand flag is turned on, and the process proceeds to step S220. In step S220, the ECU 50 calculates the outside air temperature Ta on the basis of the intake air temperature detected by the intake temperature sensor 38. Next, in step S230, the ECU 50 starts the ignition retard angle in response to a turn-on operation of the catalyst warmup demand flag. Next, in step S240, the ECU 50 determines whether or not a secondary air demand exists. If there is a secondary air demand, the ECU 50 executes the supply of secondary air (step S250). When secondary air is supplied, the air-fuel mixture supplied to the #3 cylinder is set to rich in order to promote a temperature rise inside the exhaust passage with uncombusted gas. The supply amount of secondary air is set to an amount suitable for burning exhaust gas containing unburned gas from the #3 cylinder 83 provided with the secondary air supply passage 41, or in other words, an amount corresponding to a single cylinder. By supplying secondary air, exhaust gas containing uncombusted gas is made to combust inside the exhaust passage 18, and the temperature of the branch pipe leading from the #3 cylinder 83 rises.

Next, in step S260, the ECU 50 determines whether or not the temperature Tex of the exhaust confluent part A on the upstream side of the turbocharger 4 and the wastegate valve 20 is higher than a predetermined second reference temperature th2. If the temperature Tex of the exhaust confluent part A is less than or equal to the second reference temperature th2 (step S260: No), the processing in step S250 is repeated, and operation in the retarded ignition state, as well as the supply of secondary air where appropriate, is continued until the temperature Tex becomes higher than the second reference temperature th2. The processing from step S210 to S260 is similar to the processing from step S10 to S60 in the above first embodiment, except that the process proceeds to step S260 in the case of a negative judgment in step S240 (that is, when there is no secondary air demand), and the process proceeds to step S240 in the case of a negative judgment in step S260 (that is, when the exhaust temperature Tex is less than or equal to th2).

If the temperature Tex of the exhaust confluent part A is higher than the second reference temperature th2 (step S260: Yes), a predetermined A/F oscillation operation demand flag is turned on, and the process proceeds to step S270. In step S270, the ECU 50 starts A/F oscillation operation in response to a turn-on operation of the A/F oscillation operation demand flag. In the initial state, the air-fuel ratio of the A/F oscillation operation is configured so that the #1 cylinder 81 is rich, the #2 cylinder 82 is lean, and the #3 cylinder 83 is stoichiometric. In response to the secondary air demand, the air-fuel mixture supplied to the #3 cylinder is set to rich.

In the second embodiment, the magnitude of the air-fuel ratio amplitude is set to a fixed value. However, the magnitude of the air-fuel ratio amplitude may also gradually expand from an initial value of 0 immediately after the start of A/F oscillation operation, similarly to the first embodiment. During the A/F oscillation operation, the ignition timings of the rich cylinders are retarded while the ignition timings of the lean cylinders are advanced, so as to compensate for the torque difference between the rich cylinders and the lean cylinders, and average out the torque.

Next, in steps S280 to S300, the ECU 50 determines whether or not the reaction state between the rich gas and the lean gas inside the exhaust passage 18 is incomplete due to a temperature drop in the first branch 11a caused by a low outside air temperature. The processing from step S280 to S300 is similar to the processing from step S80 to S100 in the foregoing first embodiment.

Next, in steps S310 to S330, the ECU 50 selectively executes a change in the combustion state assignment for the cylinders 81 and 82, or decreases the amplitude of the air-fuel ratio, according to the intake air amount KL. The processing from step S310 to S330 is similar to the processing in steps S110, S120, and S140 in the foregoing first embodiment.

Next, in step S340, the ECU 50 determines whether or not the temperature Tex of the exhaust confluent part A is higher than a predetermined fourth reference temperature th4. The fourth reference temperature th4 is set to a temperature so that, in a temperature region that is higher than th4, uncombusted gas is sufficiently combusted when supplying an amount of secondary air suitable for combusting exhaust gas containing the uncombusted gas from all three cylinders (that is, secondary air amount for three cylinders). If the temperature Tex of the exhaust confluent part A is less than or equal to the fourth reference temperature th4 (step S340: No), the A/F oscillation operation in step S270 continues to be executed, and the supply of secondary air in the retarded ignition state is continued until the temperature Tex becomes higher than the fourth reference temperature th4.

In the case of a positive judgment in step S340, or in other words, if the exhaust temperature Tex of the exhaust confluent part A is higher than the fourth reference temperature th4, secondary air amount for three cylinders is supplied (step S350). In this case, in order to promote a temperature rise inside the exhaust passage with uncombusted gas, the air-fuel ratio of the air-fuel mixture supplied to the #1 cylinder 81 (the rich cylinder) and the #3 cylinder 83 (the cylinder that receives the supply of secondary air) is enriched further. The amount of secondary air to supply is set to an amount corresponding to the enrichment of the air-fuel mixture. By supplying secondary air, exhaust gas containing uncombusted gas is made to combust inside the exhaust passage 18, and the temperature Tex of the exhaust confluent part A rises further.

Finally, the ECU 50 judges whether or not catalyst warmup has completed (S360). This judgment may be made on the basis of at least one from among the cumulative value of the intake air amount detected by the airflow meter 31 and an estimated value or detected value (detected using a thermocouple or the like) of the catalyst temperature, for example. When respectively predetermined reference values are reached, a positive judgment is made, and the present routine ends. In the case of a negative judgment in step S360, the processing from step S240 to S350 is repeatedly executed until the judgment becomes positive, or in other words, until catalyst warmup finishes.

Figure 10:
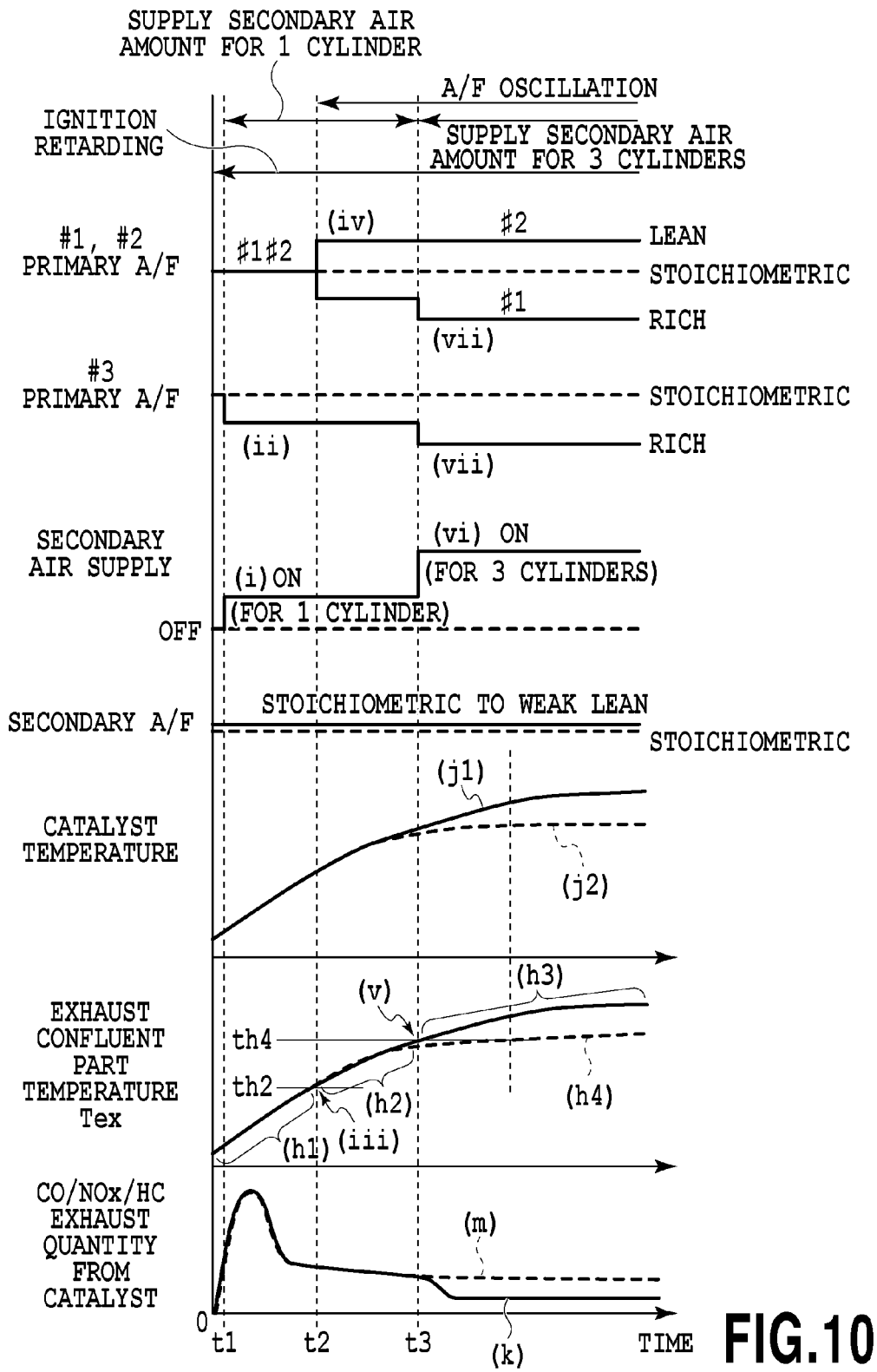
FIG. 10 is a timing chart illustrating an example of changes in respective parameters according to the second embodiment of the present disclosure.

FIG. 10 is a timing chart illustrating the operating state of each component when the above catalyst warmup process is executed. The horizontal axis indicates the elapsed time after the engine starts. In FIG. 10, first, if there is a secondary air demand at time t1 (step S240: Yes), a supply of secondary air to the branch of the #3 cylinder 83 (i) is executed (S250). At this point, the air-fuel ratio of the relevant #3 cylinder 83 (designated the "primary A/F" in the chart) is enriched (ii). As a result of the ignition retarding (S230) and the supply of secondary air (S250), the exhaust temperature Tex rapidly increases as indicated by the solid line (h1) in FIG. 10.

At time t2, if the temperature Tex of the exhaust confluent part A becomes larger than the second reference temperature th2 (iii), the A/F oscillation operation demand flag is turned on, and A/F oscillation operation (iv) is started (S270). Specifically, the magnitude of the air-fuel ratio amplitude (that is, the respective differences of the air-fuel ratio for the lean cylinders and the rich cylinders from their median value) is expanded from 0 in a stepwise manner, and set to a target value. While the magnitude of the air-fuel ratio amplitude is increasing, the ignition timing of the #2 cylinder 82 which is the lean cylinder is advanced, and the ignition timing of the #1 cylinder 81 which is the rich cylinder is retarded. As a result of this A/F oscillation operation, the exhaust temperature Tex increases further as indicated by the solid line (h2) in FIG. 10.

Subsequently, at time t3, if the exhaust temperature Tex of the exhaust confluent part A is higher than the fourth reference temperature th4 (v), secondary air amount for three cylinders is supplied (step S350, vi). At this point, the air-fuel ratio of the air-fuel mixture supplied to the #1 cylinder 81 (the rich cylinder) and the #3 cylinder 83 (the cylinder that receives the supply of secondary air) is enriched further (vii). Consequently, the air-fuel ratio of the air-fuel mixture averaged across three cylinders is changed from stoichiometric to rich. By supplying secondary air, exhaust gas containing uncombusted gas is made to combust inside the exhaust passage 18, and the temperature Tex of the exhaust confluent part A rises further (h3). Note that in the case of a device that does not supply secondary air amount for three cylinders (step S350), it is conceivable that the exhaust temperature Tex may increase comparatively sluggishly as indicated by the curve (h4) in FIG. 10. Throughout this change in the supply amount of secondary air (i, vi), the air-fuel ratio of the gas that reaches the catalyst, designated the "secondary A/F" in the chart, is kept stoichiometric or weakly lean.

As a result of the above process, the catalyst temperature is made to increase even further since starting the supply of secondary air amount for three cylinders, as indicated by the solid line (j1) in FIG. 10. Note that in the case of a device that does not supply secondary air amount for three cylinders (step S350), it is conceivable that the catalyst temperature may increase comparatively sluggishly as indicated by the curve (j2) in FIG. 10. As a result, the CO/NOx/HC exhaust amount (k) from the three-way catalyst 21 is further reduced compared to the case of not supplying secondary air amount for three cylinders (m).

As above, in the second embodiment, there is configured a device that increases the supply amount of secondary air as the reaction state increases. Consequently, by increasing the supply amount of secondary air, catalyst warmup may be sped up. In addition, since a small amount of secondary air is supplied even when the temperature Tex of the exhaust confluent part A is comparatively low, the supply of secondary air may be started comparatively early, thereby speeding up catalyst warmup.

Also, in the second embodiment, when the reaction state is less than or equal to a fourth reference temperature (th4), the supply amount of secondary air is set to a first supply amount, whereas when the reaction state is greater than the fourth reference temperature (th4), the supply amount of secondary air is set to a second supply amount that is greater than the first supply amount. Consequently, the anticipated advantageous effects may be obtained from the present disclosure with a simple configuration.

Also, in the second embodiment, the secondary air supply passage 41 is provided only in a subset of the multiple branch pipes extending from each cylinder to the exhaust confluent part A in the exhaust passage, and thus the secondary air supply passage 41 occupies little space and has an effective space factor.

The present disclosure is not limited to the foregoing embodiments, and any modifications, applications or their equivalents that are encompassed by the ideas of the present disclosure as stipulated by the claims are to be included in the present disclosure. Consequently, the present disclosure is not to be interpreted in a limited manner, and is also applicable to other arbitrary technologies belonging within the scope of the ideas of the present disclosure.

For example, in the foregoing embodiments, the combustion state assignment is changed (swapped) for only the subset including the cylinders 81 and 82, but the assignment may also be changed (swapped) for all cylinders. Although the foregoing embodiments execute ignition retarding (S30) in response to a fast warmup demand, the execution of ignition retarding is not a required feature of the present disclosure. Although the foregoing embodiments detect the reaction state between rich gas and lean gas in the exhaust confluent part A on the basis of the variation of the air-fuel ratio in exhaust gas (the air-fuel ratio difference value ΔA/F obtained from the detected value of the A/F sensor 34) (steps S80, S280), the reaction state may also be detected by comparing the exhaust temperature Tex to a predetermined reference value. In this case, if the exhaust temperature Tex is lower than a predetermined reference value, the reaction state may be judged to be low. The exhaust temperature Tex detection point in this case is preferably at the exhaust confluent part A or farther downstream, and upstream from the three-way catalyst 21.

In the second embodiment, the supply amount of secondary air is changed discretely or in a stepwise manner between "off", "amount for one cylinder", and "amount for three cylinders", but the supply amount of secondary air may also be changed proportionally or continuously between them. Correspondingly, the air-fuel ratio of each cylinder may also be changed proportionally or continuously.

In the foregoing embodiments, the secondary air supply passage 41 is provided for only a single cylinder, but the secondary air supply passage 41 may also be provided for two or more cylinders.

In the foregoing embodiments, a three-way catalyst 21 is used as the catalyst, but in the present disclosure, other types of catalysts, particularly various catalysts that demand heat treatment up to an activation temperature, are also applicable. In the foregoing embodiments, the present disclosure is applied to an engine 8 equipped with a turbocharger 4, a bypass passage 19, and a wastegate valve 20, but none of these components are required. In the foregoing embodiments, the present disclosure is applied to a gasoline internal combustion engine, but the present disclosure is also applicable to internal combustion engines that use a fuel other than gasoline, such as a diesel engine or gaseous-fueled engine, and such configurations also belong within the scope of the present disclosure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An internal combustion engine control device comprising:
    an internal combustion engine that includes a catalyst device in an exhaust passage; and
    a controller programmed to control the internal combustion engine, wherein the controller is further programmed to:
    execute A/F oscillation operation in which lean combustion is conducted in at least one cylinder and rich combustion is conducted in at least one other cylinder,
    detect a reaction state between rich gas and lean gas at a detection point inside the exhaust passage on an upstream side of the catalyst device, on the basis of a predetermined physical amount of exhaust gas of the internal combustion engine, and
    change combustion state assignment for at least one of the cylinders from lean combustion to rich combustion, or from rich combustion to lean combustion, on the basis of the reaction state,
    wherein the internal combustion engine further includes a secondary air supplier that supplies secondary air to an exhaust passage on an upstream side of the detection point, and the controller is further programmed to control a supply amount of the secondary air from the secondary air supplier, so that the supply amount of the secondary air increases as the reaction state rises.

2. The internal combustion engine control device according to claim 1, wherein the controller is further programmed to set, if the reaction state is less than or equal to a second reference value (th4), the supply amount of the secondary air to a first supply amount, and if the reaction state is greater than the second reference value (th4), the supply amount of the secondary air to a second supply amount that is greater than the first supply amount.

3. The internal combustion engine control device according to claim 1, wherein the secondary air supplier is provided only in a subset of multiple branch pipes extending from each cylinder to an exhaust confluent part in the exhaust passage.

4. The internal combustion engine control device according to claim 1, wherein the physical amount is a degree of variation in exhaust air-fuel ratio between a cylinder assigned to lean combustion and a cylinder assigned to rich combustion, and the controller is further programmed to detect, if the degree of variation in exhaust air-fuel ratio is greater than a reference value, that the reaction state is less than a predetermined value.

5. The internal combustion engine control device according to claim 1, wherein the physical amount is an exhaust temperature, and the controller is further programmed to detect, if the exhaust temperature is lower than a reference value, that the reaction state is less than a predetermined value.

6. The internal combustion engine control device according to claim 1, wherein the detection point is provided in an exhaust confluent part where branch pipes from each cylinder converge in the exhaust passage.

7. An internal combustion engine control device comprising:
    an internal combustion engine that includes a catalyst device in an exhaust passage; and
    a controller programmed to control the internal combustion engine, wherein the controller is further programmed to:
    execute A/F oscillation operation in which lean combustion is conducted in at least one cylinder and rich combustion is conducted in at least one other cylinder,
    detect a reaction state between rich gas and lean gas at a detection point inside the exhaust passage on an upstream side of the catalyst device, on the basis of a predetermined physical amount of exhaust gas of the internal combustion engine, and
    change combustion state assignment for at least one of the cylinders from lean combustion to rich combustion, or from rich combustion to lean combustion, on the basis of the reaction state,
    wherein the controller is further programmed to assign, if the reaction state is less than a predetermined value, a combustion state so that rich combustion is conducted by a cylinder that is farthest away from the catalyst device in terms of a length of the exhaust passage, and lean combustion is conducted by at least one cylinder closer to the catalyst device than the cylinder that is farthest away.

8. An internal combustion engine control device comprising:
    an internal combustion engine that includes a catalyst device in an exhaust passage; and
    a controller programmed to control the internal combustion engine, wherein the controller is further programmed to:
    execute A/F oscillation operation in which lean combustion is conducted in at least one cylinder and rich combustion is conducted in at least one other cylinder,
    detect a reaction state between rich gas and lean gas at a detection point inside the exhaust passage on an upstream side of the catalyst device, on the basis of a predetermined physical amount of exhaust gas of the internal combustion engine, and
    change combustion state assignment for at least one of the cylinders from lean combustion to rich combustion, or from rich combustion to lean combustion, on the basis of the reaction state,
    wherein the controller is further programmed to forbid the change if an intake air amount is greater than a predetermined value.

9. The internal combustion engine control device according to claim 1, wherein the controller is further programmed to start the A/F oscillation operation on a condition that the reaction state has become greater than a first reference value (th2).

* * * * *